No. 629,102. Patented July 18, 1899.
W. BORROWE & J. LUMLEY.
MANUFACTURE OF HEAT INSULATING COVERINGS.
(Application filed Aug. 9, 1898.)
(No Model.) 2 Sheets—Sheet 2.
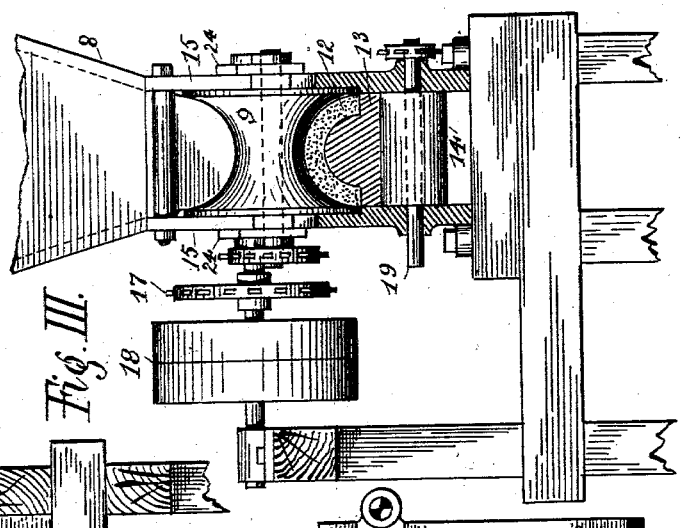
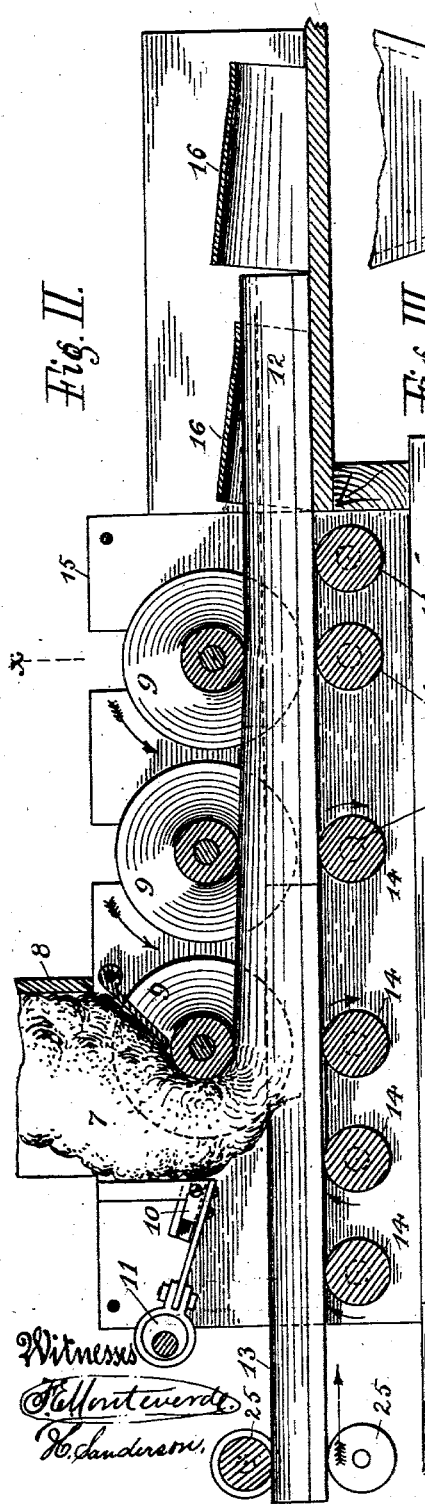
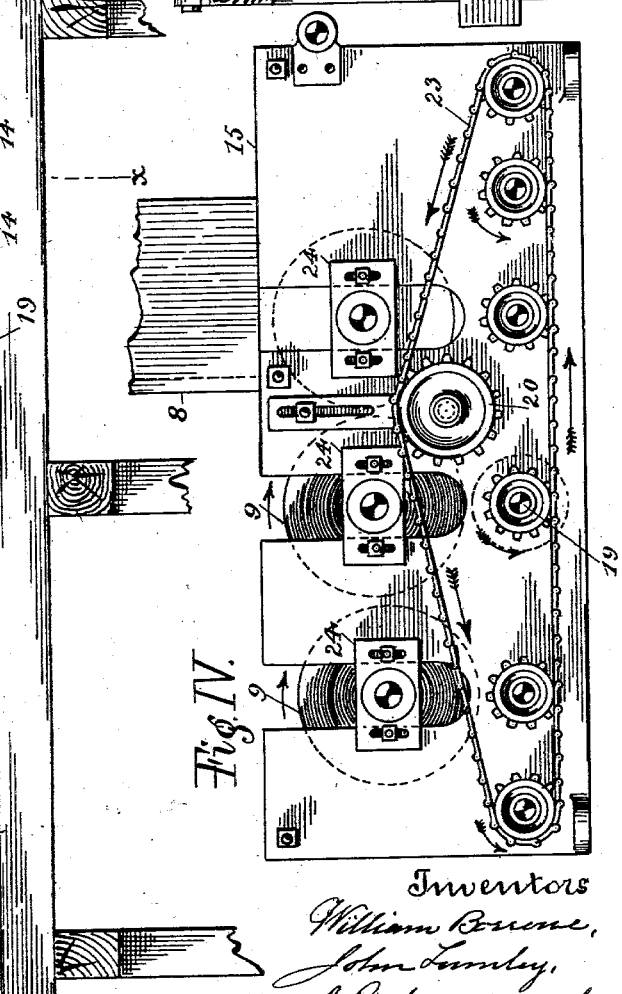

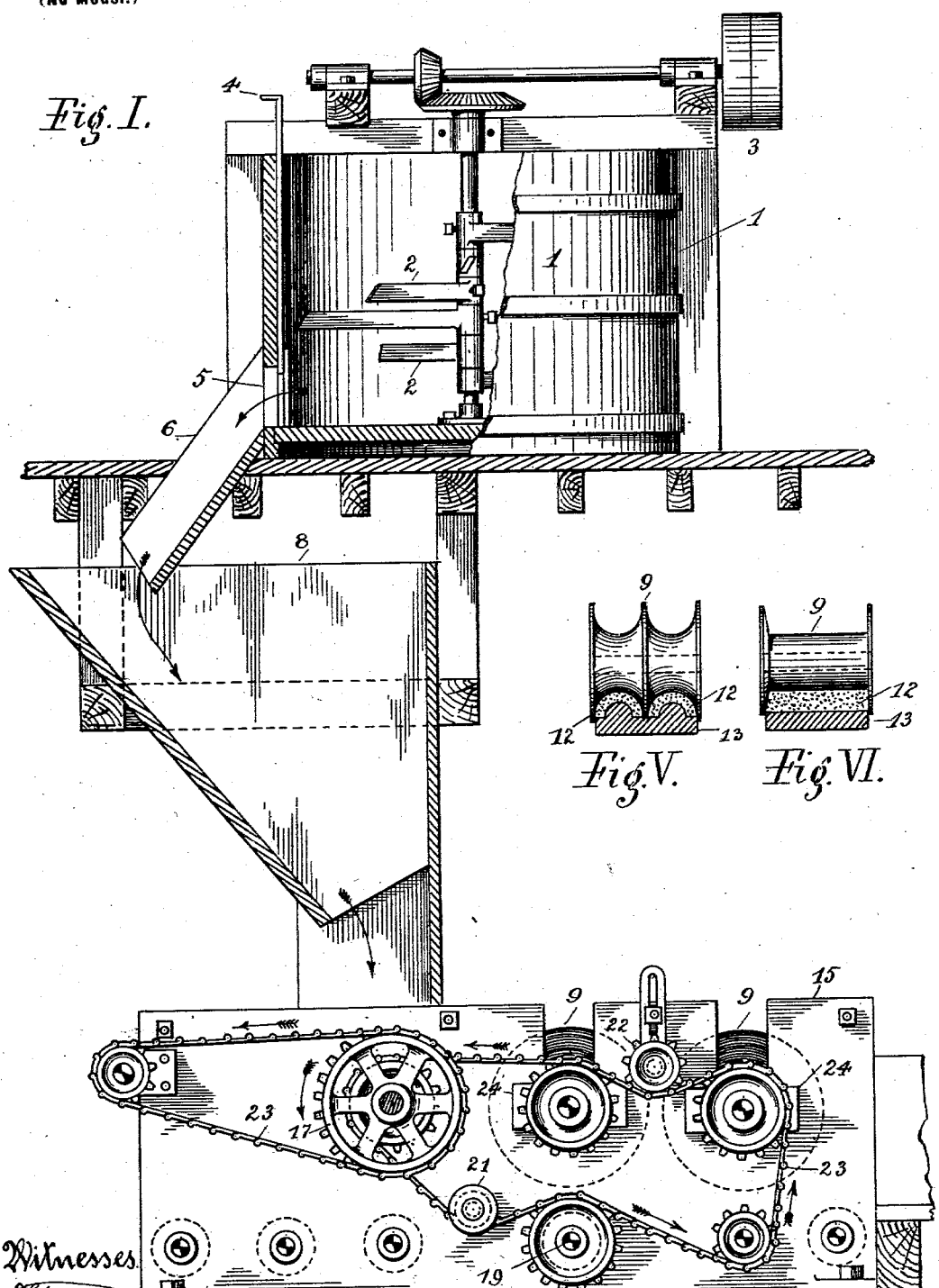

UNITED STATES PATENT OFFICE.

WILLIAM BORROWE AND JOHN LUMLEY, OF SAN FRANCISCO, CALIFORNIA.

MANUFACTURE OF HEAT-INSULATING COVERINGS.

SPECIFICATION forming part of Letters Patent No. 629,102, dated July 18, 1899.

Application filed August 9, 1898. Serial No. 688,190. (No model.)

*To all whom it may concern:*

Be it known that we, WILLIAM BORROWE and JOHN LUMLEY, citizens of the United States, residing at San Francisco, county of San Francisco, and State of California, have invented certain new and useful Improvements in the Manufacture of Heat-Insulating Coverings; and we hereby declare the following to be a full, clear, and exact description of the same, reference being had to the accompanying drawings, forming a part of this specification.

Our invention relates to the manufacture of insulating or heat-non-conducting covering to conserve or repel heat in pipes or other structures and to machines and apparatus for such manufacture.

Our improvements consist in the application of rolling surfaces to shape or mold the sections of covering material while in a plastic state on forms or moldboards adapted to produce tubular, flat, or other shapes to fit upon surfaces to be insulated or protected by the covering, as distinguished from extrusion or press-molding of such forms or pieces, and they also consist in various devices to carry out and apply our system of operating, as will be hereinafter described and explained.

The objects of our invention are to secure continuous and rapid operation in the process of molding or shaping the covering-sections by rolling action without pressure to a degree that will impair their porosity, to attain complete uniformity of such covering-pieces in their internal structures and cross-section, and to adapt the same machinery to the production of the various shapes required in practice.

To apply our invention, we provide machinery and apparatus substantially as illustrated in the accompanying drawings, forming a part of this specification, and in which—

Figure I is an elevation, partially in section, of a machine and apparatus constructed and operating according to our invention. Fig. II is a longitudinal section through the main acting devices to form and shape the material. Fig. III is a cross-section on the line x x in Fig. II. Fig. IV is an obverse side view of the rolling or forming machine shown in Fig. I. Fig. V shows in side view an example of the rollers adapted to form two semicircular sections or a complete tube at the same time. Fig. VI is a side view of one of the rollers employed in making flat slabs of the covering material.

Material for heat insulation is commonly composed of some earthy substance, such as magnesia, asbestos, diatomaceous earth, or other infusorial material, usually mixed with some adherent fibrous material, preferably of cellular structure, which in the process of manufacture is reduced to a plastic state by admixture with water and then is molded into various sections of flat or circular or other shape to fit the surfaces to which the pieces are to be applied. As the principal function of such heat-insulating material is to retain fixed air, its porosity is an essential feature, and in molding the pieces or sections the object is to so modify and distribute any pressure applied that the pores of the material will not be closed up and the air expelled therefrom.

Referring to the drawings, Fig. I represents a plant or apparatus for preparing the material and molding pipe-covering, slabs, or staves from the usual material, which is comminuted or ground and placed in a mixing-tank 1, with water enough to form a plastic compound. In this tank 1 is a rotary stirring device provided with radial vanes 2 and gearing to impart motion from the driving-pulleys 3 in the usual manner. A sliding gate 4 opens an escape-aperture 5, through which the material, after being properly mixed, is expelled into a spout 6. From the spout 6 the material falls into the hopper 8 and descends, as seen in Fig. II, down to the first of the top or forming rollers 9 and is distributed laterally thereover at the front by a rapidly-reciprocating slide 10, operated by the cam 11. This action breaks up continuity of the stream of the material, and, as before mentioned, distributes it over the section 12 to be formed. Beneath the material 7 are placed moldboards 13, preferably of a length corresponding to that of the section 12 to be made. The moldboards 13 rest upon the bearing-rollers 14, which being positively and coincidently driven, as are the top or forming rollers 9, the moldboards 13 and material 7 progress continually through the machine, the latter taking the required form, as shown at 12 in Fig. III.

The rollers 9 and 14, as will be seen in Fig. III, fit closely at their ends against the main side plates 15 of the machine, confining the material to the section shown or to some other, as the shape of the rollers 9 and the moldboards 13 may determine. The rollers 9 are set at different heights above the plane of movement, so that they will successively, but in a gentle manner, compress the material, driving out the free water, but not compacting or condensing the mass so as to destroy its porosity.

The top or forming rollers are of various configuration, corresponding to the required sections to be made. Figs. I, II, and III show rollers and moldboards to produce semicylindrical pipe-covering pieces of a large size. They can also be of any number, so the compression will take place in two or more stages, as its nature demands.

Fig. V shows one of a set of forming-rollers to produce two sections of the same form, but of smaller size, and Fig. VI shows a forming-roller to produce flat slabs, such as are employed in covering plane surfaces, these two being the principal forms required in use. After the sections 12 have moved out from beneath the last of the rollers 9 they pass through one or more dressing-dies 16, formed of some suitable material that slightly compresses, dresses, and smooths the outer surfaces. After passing the dies 16 the material is severed at the ends of the moldboards 13, and these, with the material upon them, are removed to a kiln or other suitable place for drying the sections, which are afterward trimmed to accurate lengths and otherwise, if necessary, ready for packing or for use.

The forming-rollers 9 and bearing-rollers 14 can be driven by any suitable gearing, but preferably by means of chains and sprocket-wheels, as shown in Figs. I, III, and IV, the wheel 17 being the first mover driven from the pulley 18, motion being transmitted across the machine by means of the shaft 19, forming the axis of one of the rollers 14, as seen in Fig. III.

20, 21, and 22 are idle-wheels to maintain tension of the chain 23.

The forming-rollers 9 are held in detachable bearings 24, so as to be readily removed and substituted when the form or size of the covering-sections is to be changed.

In case the traction of the rollers 9 is not sufficient to cause a regular feed of the moldboards 13 through the machine any of the usual feeding devices can be employed—as, for example, a pair of feeding-rollers, as indicated at 25 in Fig. II, or a driven chain or belt beneath the moldboards, as will be understood without illustration.

Having thus described the nature and object of our invention, what we claim as new, and desire to secure by Letters Patent is—

1. The combination of feed-hopper 8, reciprocating slide 10, forming-rollers 9, bearing-rollers 14, means for positively rotating said forming and bearing rollers simultaneously, dressing-dies 16 and moldboard 13, resting upon said bearing-rollers, shaped upon its upper surface to conform to the shape of the desired product, substantially as specified.

2. The combination of forming-rollers 9, bearing-rollers 14, means for rotating said forming and bearing rollers simultaneously, moldboard 13, shaped upon its upper surface to conform to the shape of the desired product, and fixed dressing-dies 16, one or more, located beyond said forming and bearing rollers, in the path of said moldboard, substantially as specified.

3. The combination of removable forming-rollers 9, progressively set at different heights above the plane of movement, detachable bearings 24, bearing-rollers 14, having their upper surfaces in a true plane, means for positively rotating said forming and bearing rollers simultaneously, moldboard 13, shaped upon its upper surface to conform to the shape of the desired product, plane upon its lower surface, and fixed dressing-dies 16, located in the path of said moldboard, substantially as specified.

These features we believe to be novel and useful and ask that Letters Patent be granted therefor.

WILLIAM BORROWE.
JOHN LUMLEY.

Witnesses:
H. SANDERSON,
JAMES L. KING.